United States Patent [19]
Hoshino et al.

[11] Patent Number: 5,756,220
[45] Date of Patent: *May 26, 1998

[54] OBJECT TO BE CHECKED FOR AUTHENTICITY AND A METHOD FOR MANUFACTURING THE SAME

[75] Inventors: Hidekazu Hoshino; Itsuo Takeuchi; Masumi Yoda; Minoru Komiya; Tsugutaka Sugahara, all of Yokohama, Japan

[73] Assignee: NHK Spring Co., Ltd., Yokohama, Japan

[*] Notice: The term of this patent shall not extend beyond the expiration date of Pat. No. 5,602,381.

[21] Appl. No.: 688,132

[22] Filed: Jul. 29, 1996

Related U.S. Application Data

[63] Continuation of Ser. No. 347,976, Dec. 1, 1994, Pat. No. 5,601,931.

[30] Foreign Application Priority Data

| Dec. 2, 1993 | [JP] | Japan | 5-303033 |
| Dec. 2, 1993 | [JP] | Japan | 5-303065 |
| Dec. 10, 1993 | [JP] | Japan | 5-310423 |
| Jun. 10, 1994 | [JP] | Japan | 6-128878 |

[51] Int. Cl.$^6$ ............... B32B 29/00; G06K 19/00
[52] U.S. Cl. ............... 428/537.5; 428/694 R; 428/900; 428/916; 235/493; 360/2; 283/82; 283/904
[58] Field of Search ............... 428/227, 537.5, 428/694 R, 900, 916; 235/493; 360/2; 283/82, 904

[56] References Cited

U.S. PATENT DOCUMENTS

| 3,838,252 | 9/1974 | Hynes et al. | 235/61.12 M |
| 3,860,796 | 1/1975 | Wallace et al. | 235/61.12 M |
| 4,114,032 | 9/1978 | Brosow et al. | 235/493 |
| 4,183,989 | 1/1980 | Tooth | 428/195 |
| 4,218,674 | 8/1980 | Brosow et al. | 340/149 |
| 4,450,348 | 5/1984 | Stockburger et al. | 235/380 |
| 4,756,557 | 7/1988 | Kaule et al. | 283/85 |
| 4,820,912 | 4/1989 | Samyn | 235/449 |
| 5,001,331 | 3/1991 | Leestemaker | 235/375 |
| 5,110,651 | 5/1992 | Massard et al. | 428/105 |
| 5,143,583 | 9/1992 | Marchessault et al. | 162/138 |
| 5,324,079 | 6/1994 | Kaule et al. | 283/82 |
| 5,451,759 | 9/1995 | Hoshino et al. | 235/449 |
| 5,473,147 | 12/1995 | Hoshino et al. | 235/449 |
| 5,602,381 | 2/1997 | Hoshino et al. | 235/493 |

OTHER PUBLICATIONS

U. S. Ser. No. 08/243,582, Hoshino et al., filed May 16, 1994.

*Primary Examiner*—Steven A. Resan
*Attorney, Agent, or Firm*—Pennie & Edmonds LLP

[57] ABSTRACT

A large number of magnetic polymer elements are distributed at random in a base material of a object to be checked. Each magnetic polymer element includes an element main body formed of a high-molecular material, such as an acrylic resin, and magnetic metal powder contained therein. The base material is formed mainly of paper, and the magnetic polymer elements are incorporated together with wood pulp fibers in the base material. The elements and the fibers are tangled with one another in three dimensions. Indication data including figures, symbols, etc., such as post position numbers and bet numbers on betting tickets for publicly-managed gambling, are printed on the object. The indication data, along with a proper output signal obtained in accordance with the state of distribution of the magnetic polymer elements, are enciphered according to specific rules for enciphering, and are recorded in a code indicator section by means of a recording medium, such as a magnetic stripe which is magnetically readable or a bar code which is optically readable.

9 Claims, 10 Drawing Sheets

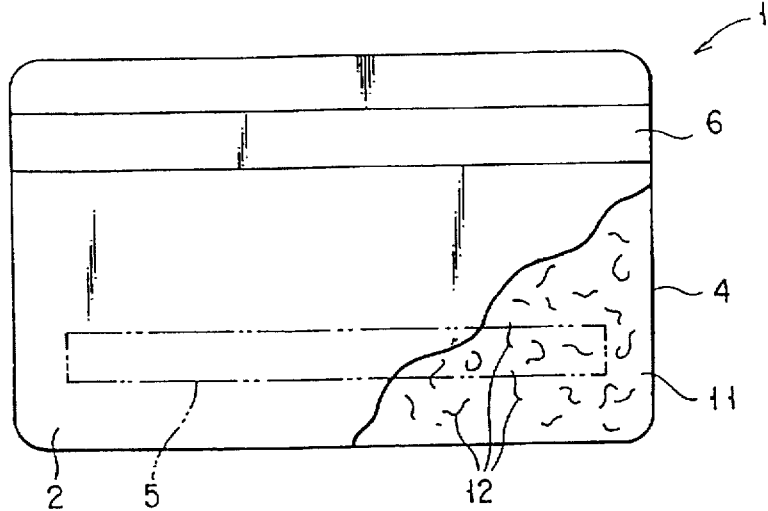
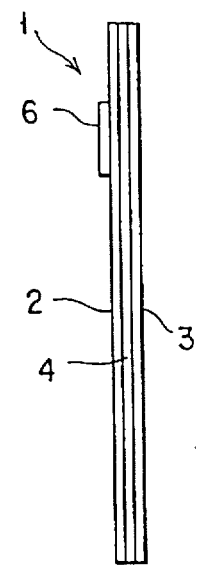
FIG. 1
FIG. 2
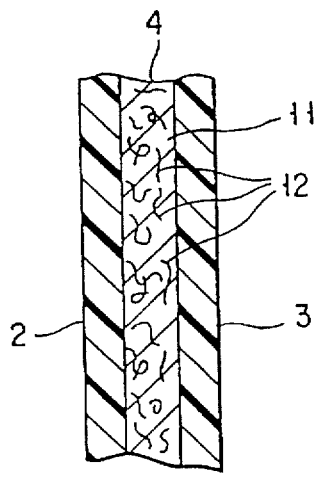
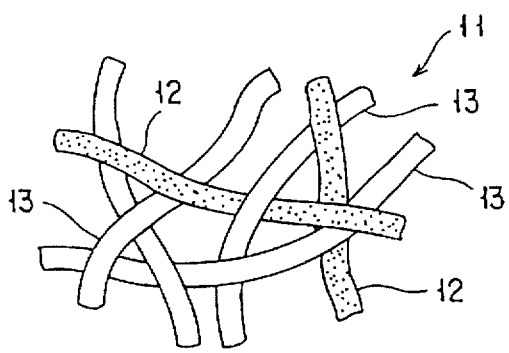
FIG. 3
FIG. 4
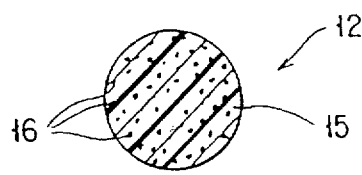
FIG. 5

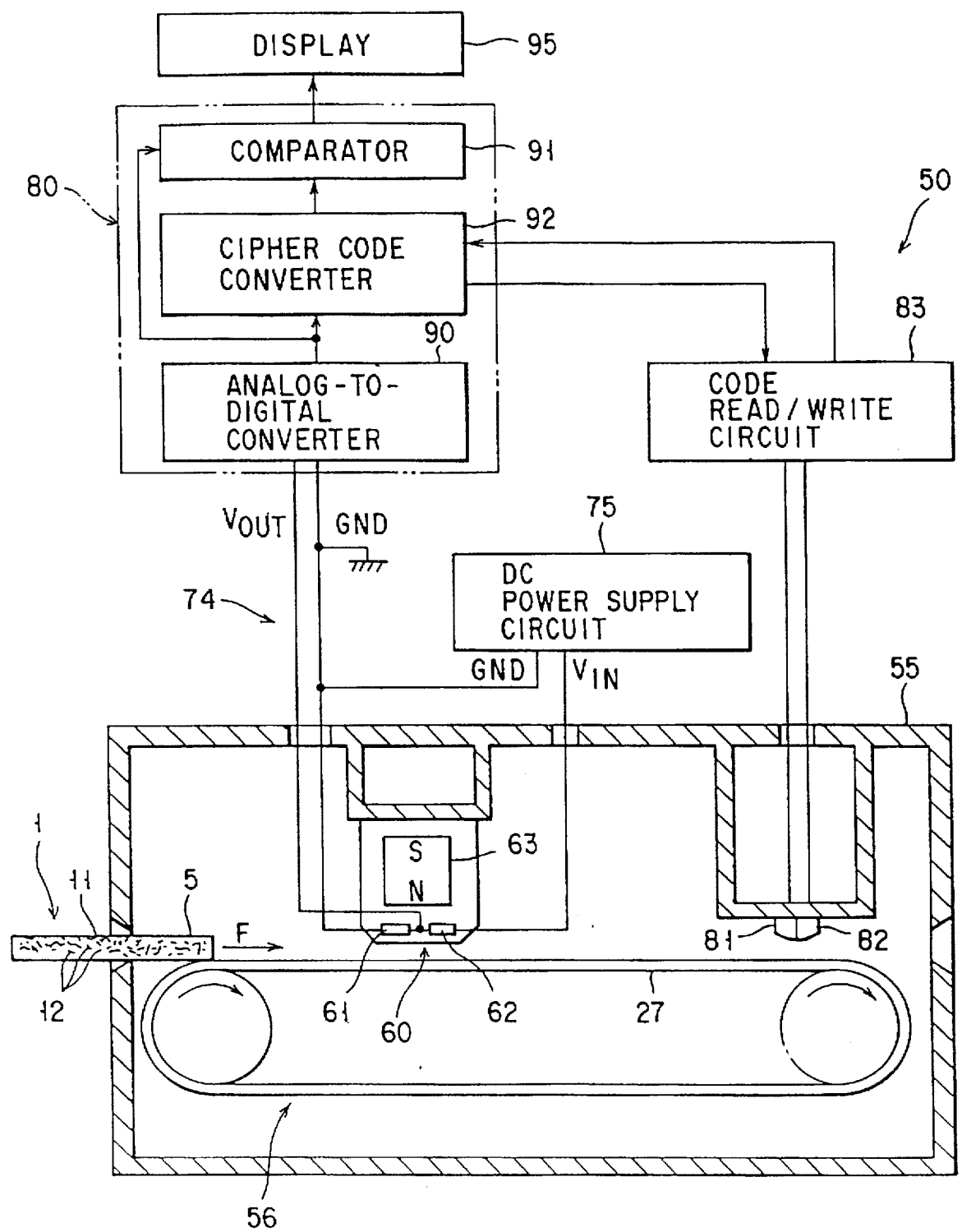
F I G. 10

OBJECT TO BE CHECKED FOR AUTHENTICITY AND A METHOD FOR MANUFACTURING THE SAME

This is a continuation of application Ser. No. 08/347,976, filed Dec. 1, 1994 now U.S. Pat. No. 5,601,931.

BACKGROUND OF THE INVENTION

1. Field of the Invention

The present invention relates to objects which should be prevented from being forged and are to be checked for authenticity, such as important documents, securities, paper money, merchandise bonds and other coupons, checks, traveler's checks, bank cards, credit cards, prepaid cards, admission tickets for various entertainments and parties, passenger tickets for various vehicles and aircrafts, and betting tickets for publicly-managed gambling (e.g., speedboat, bicycle, and horse races), and a method for manufacturing the same.

2. Description of the Related Art

A checking method and apparatus utilizing microwaves are known in the art as measures for checking the authenticity of documents or the like, as described in Jpn. Pat. Appln. KOKAI Publication No. 5-270181 and PCT National Publication No. 63-501250 (i.e., U.S. Pat. No. 4,820,912). In this prior art method or apparatus, microwaves are applied to a large number of metallic wires, such as stainless-steel wires, which are distributed at random in a document or the like, and a proper digital mark corresponding to a response microwave bundle is recorded in a suitable region of the document according to specific rules. In checking the document for authenticity, the microwaves are applied to the document, and the digital mark is collated with the response microwave bundle. If the mark and the microwave bundle agree with each other, it is concluded that the document is authentic.

Checking means which utilizes microwaves, such as the one used in the conventional apparatus described in the aforesaid publications, is liable to be influenced by external noises as it measures the response microwave bundle, so that its signal-to-noise ratio (S/N ratio) is low. Moreover, the prior art apparatus, which oscillates microwaves, may possibly constitute a source of noises. In general, furthermore, microwave transmitters and receivers are large-sized and expensive.

In the case where metallic wires are embedded in a thin object, such as paper, there is a possibility of the wires being exposed in the surface of the object. If this occurs, the metallic wires are so conspicuous that the security cannot be maintained. In the case where the object containing the metallic wires is cut into pieces of a desired size by means of a cutter, the wires may partially project from cut edges of the object, or the cutter life may be shortened considerably. Moreover, the metallic wires constitute a hindrance to satisfactory printing or coloring, and may rust in some cases.

When the object is bent, the metallic wires may possibly be broken or crooked, thereby projecting from the surface of the object, or the distribution of the metallic wires peculiar to the object may become different from the original state, thereby making code collation impossible.

In the case of a pari-mutuel ticket for a horse race, data including the serial number of the ticket purchased by a bettor, post position numbers, bet numbers, etc. are printed in figures on the obverse of the ticket. Also, these indication data are encoded according to specific rules, and are magnetically recorded as magnetic data in a magnetic layer on the reverse of the ticket. In this case, the magnetic data are read by means of a promoter's ticket reading apparatus when repayment is claimed after the race. Thereupon, the serial number, post position numbers, bet numbers, etc. are read, and a share for winning bets is paid.

Alternatively, according to some other betting tickets for publicly-managed gambling, a bar code is arranged in a predetermined position in the ticket instead of using the magnetic data. In this case, illegal or wrongful acts, such as alteration of data, are prevented by recording post position numbers, bet numbers, etc. in the bar code.

In the case of the aforementioned pari-mutuel ticket, the indication data, including the post position numbers, bet numbers, etc., are printed in figures on the obverse of the ticket, while the magnetic data associated with the indication data are recorded in the magnetic layer on the reverse. The ticket of this type is somewhat advantageous in preventing malicious alteration or reproduction, since the details of the magnetic data are invisible. In this case, however, the magnetic layer entails a very high cost for each ticket. For example, a ticket having the magnetic layer may be several times as expensive as one which uses a bar code. If the ticket is provided with the magnetic layer, moreover, then it will contain too much magnetic material. Accordingly, the ticket will not be able to be reused as reclaimed paper, and besides, will involve problems concerning incineration. Thus, disposal of used tickets is a serious problem.

In some alternative betting tickets for publicly-managed gambling, the indication data, including the post position numbers, bet numbers, etc., are printed in figures on the obverse of the ticket, and cipher code associated with these indication data is recorded in the form of a bar code one the ticket surface. In this case, however, the indication data and the bar code are visible. Even though the post position numbers, bet numbers, etc. are enciphered and represented in the bar code, therefore, a key to falsification of the bar code may possibly be given to permit illegal use of the ticket as a winning one when rules for enciphering are revealed. If winning tickets are identified by the bar code only, moreover, there is a possibility of duplicates (or so-called dead copies) of the winning tickets being made.

SUMMARY OF THE INVENTION

Accordingly, the object of the present invention is to provide a to-be-checked object with high security which substantially prevents illegal or wrong use of forged documents or the like, and which is free of the problems incidental to a to-be-checked object having metallic wires embedded therein.

In order to achieve the above object, a to-be-checked object according to the present invention comprises a base material formed of paper containing a large number of wood pulp fibers, and a large number of fibrous magnetic polymer elements incorporated in the base material, together with the wood pulp fibers, each of the elements including an element main body formed of a high-molecular weight material and magnetic metal powder contained therein, the wood pulp fibers and the magnetic polymer elements being tangled with one another in three dimensions.

An example of a high-molecular weight material used for the element main body of each magnetic polymer element is an acrylic resin. The magnetic metal powder may suitably be formed of a magnetically-soft material having high permeability, such as Permalloy, Sendust, Co-based amorphous material, or soft ferrite, or a magnetically-hard material having high coercive force, such as ferrite, Sm—Co alloy, or Nd alloy.

If necessary, the object according to the present invention comprises a scanning region located in a specific position in the base material and a code indicator section for storing encoded information corresponding to a proper output (detection signal) obtained in accordance with the state of the magnetic polymer elements in the scanning region.

The magnetic polymer elements incorporated in the object according to the invention are so much softer than metallic wires that they never project from the surface of the object, or bend or break even when the object is doubled. Thus, the object is highly resistant to bending and cannot be easily damaged, and its surface can maintain suitable conditions for printing and coloring. Moreover, the elements are apparently inconspicuous and high in security, and never rust. Furthermore, the distribution pattern of the elements can be prevented from changing during use.

A method for manufacturing an object to be checked according to the present invention comprises a step of fabricating each of magnetic polymer elements by incorporating magnetic metal powder into an element main body formed of a high-molecular weight material, a step of preparing a pulp solution containing wood pulp fibers and the magnetic polymer elements mixed together, a step of stirring the pulp solution to make a sheet with a predetermined thickness in which the wood pulp fibers and the magnetic polymer elements are tangled with one another in three dimensions, and a step of cutting the sheet into pieces of a predetermined size by means of a cutter.

The base material for the object of the invention is formed mainly of paper which is used for various tickets, and the magnetic polymer elements and the base material enjoy high integrity and fixing strength. Since the distribution (depth of embodiment, in particular) of the magnetic polymer elements cannot be altered, the object can provide high security. Moreover, the material can be easily cut into pieces of a predetermined size by means of a cutter, without exerting a bad influence on the life performance of the cutter and without allowing the elements to be drawn out from cut edges of the object. Furthermore, data may be printed on the surface of the base material or handwritten thereon by means of a writing utensil such as a pen. Thus, the resulting object can be used in a wide field of application.

A card-like object to be checked according to the present invention comprises card base members of a synthetic resin or paper with a predetermined size, and a magnetic-polymer-filled layer sandwiched between the card base members for lamination and including a base material formed of a non-magnetic material and magnetic polymer elements incorporated therein, each of the elements including an fibrous element main body formed of a high-molecular weight material and magnetic metal powder contained therein, the polymer-filled layer bearing a scanning region in a specific position therein.

A code indicator section is stored with information associated with a proper detection signal which is obtained in accordance with the state of the magnetic polymer elements in the scanning region. Normally, this code indicator section is formed of a magnetically readable recording medium, such as a magnetic stripe, or an optically readable recording medium, such as a bar code. Alternatively, however, the data may be stored in a memory of a host computer or the like. In this case, the magnetic stripe or the bar code may be omitted.

An example of a process for manufacturing the aforementioned card-like object comprises a step of fabricating the card base members, a step of fabricating the magnetic polymer elements, a step of preparing the magnetic-polymer-filled layer by incorporating the magnetic polymer elements into the base material formed of the nonmagnetic material, and a step of uniting the base members and the polymer-filled layer together by heat welding or by means of an adhesive. The base members may be united with a plurality of base materials in a manner such that the magnetic polymer elements are distributed between the base materials.

In the case where the base material of the magnetic-polymer-filled layer is formed mainly of paper, the magnetic polymer elements should preferably be incorporated together with the wood pulp fibers into the base members. In the case where the base material is formed mainly of a synthetic resin, on the other hand, the magnetic polymer elements are embedded at random in the resin.

If necessary, the whole outer peripheral surface of each magnetic polymer element is covered by a coating layer which resembles the base material in color. Alternatively, the magnetic polymer elements themselves may be made to contain a pigment (e.g., titanium oxide) of the same color as the base material. The surface of each card base member is covered, as required, by a protective-layer (overlay film) of a transparent synthetic resin.

The magnetic-polymer-filled layer is attached to the plastic card base members for lamination so that its shape is maintained thereby. Thus, it is strong and cannot be easily broken, distorted, or crumpled. Since the magnetic polymer elements themselves have good stretchability and flexibility, moreover, the object is highly resistant to bending, so that change of the distribution of the elements can be avoided.

Further, the object according to the present invention can produce the following effects.

The magnetic polymer elements, as compared with metallic wires, contain a very small amount of metallic components. These elements can be recycled. Since the coefficient of thermal expansion of the magnetic polymer elements is nearer to that of the base material (paper or synthetic resin) than to that of the metallic wires, the card-like object cannot be easily cracked or separated. Since the magnetic polymer elements are higher in stretchability and flexibility than the metallic wires, moreover, they never appear on the surfaces of the plastic card base members when the base members are embossed. Further, innumerable fine projections cover the surface of each magnetic polymer element. Accordingly, the magnetic polymer elements can bite the base material satisfactorily, and can be prevented from partially projecting from the cut edges (end faces) of the object.

An object to be checked according to another aspect of the present invention comprises a base material formed mainly of paper and carrying predetermined indication data thereon, magnetic polymer elements incorporated together with wood pulp fibers in the base material, a scanning region located in a specific position in the base material, and a code indicator section for storing an optically readable code in part of the base material, the code being obtained by enciphering the indication data and a proper detection signal in association with one another according to specific rules for enciphering, the detection signal being obtained in accordance with the state of the magnetic polymer elements in the scanning region.

In an apparatus for checking the object for authenticity, the object is moved at a predetermined speed as the detection signal corresponding to the distribution of the magnetic polymer elements in the scanning region is detected by detecting means. This detection signal and the indication data are enciphered according to the predetermined rules for enciphering, and are recorded in the code indicator section by means of a bar code or the like. In this case, the indication data are enciphered by using random figures which have no relation thereto and are based on the detection signal peculiar to the object. Accordingly, the resulting cipher code is more difficult to decode than that of a conventional object which is enciphered by using indication data only.

Thus, according to the objects of the present invention, the indication data are enciphered in accordance with the pattern of the magnetic polymer elements peculiar to each object and represented in a bar code or the like. If the code is copied as it is, collation can reveal the counterfeitness of the copy. It is impossible, therefore, to make a duplicate (or so-called dead copy) of an authentic object. Even if the bar code can be falsified, moreover, it is substantially impossible to change the pattern of the magnetic polymer elements used in each object of the invention, since the elements are tangled with the wood pulp fibers. In consequence, illegal or wrong use of forged objects can be prevented to attain a very high degree of security.

According to the present invention, it is substantially impossible to falsify or reproduce the objects to be checked, so that high security is ensured, a reading apparatus for optically reading the data from the code indicator section is available at low cost, and the data can be processed at high speed. The manufacturing cost of the to-be-checked objects according to the invention is not higher than half that of conventional ones which have a magnetic layer on the reverse side. Moreover, the objects of the invention is formed mainly of paper, which contains a small amount of magnetic metal powder. Thus, the objects can be reused in the form of reclaimed paper or incinerated without any problems.

BRIEF DESCRIPTION OF THE DRAWINGS

FIG. 1 is a cutaway plan view of a to-be-checked object according to one embodiment of the present invention;

FIG. 2 is a side view of the to-be-checked object shown in FIG. 1;

FIG. 3 is a partial enlarged sectional view of the to-be-checked object shown in FIG. 1;

FIG. 4 is an enlarged sectional view showing some of magnetic polymer elements and wood pulp fibers in the to-be-checked object shown in FIG. 1;

FIG. 5 is a sectional view of a magnetic polymer element used in the to-be-checked object shown in FIG. 4;

FIG. 10 is a partially-sectional side view showing an apparatus for processing the to-be-checked object;

DETAILED DESCRIPTION OF THE PREFERRED EMBODIMENTS

Figure 6:
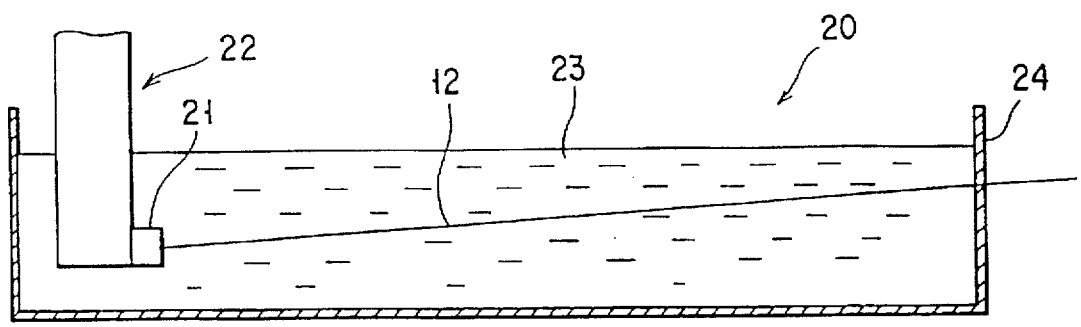
FIG. 6 is a sectional view showing an outline of an apparatus used for manufacturing the magnetic polymer elements.

One embodiment of the present invention will now be described with reference to FIGS. 1 to 12.

A card-like object 1 to be checked shown in FIGS. 1 and 2 is composed of first and second plastic card base members 2 and 3, which has a predetermined size, and a magnetic-polymer-filled layer 4 sandwiched between the base members 2 and 3 for lamination. In general, the base members 2 and 3 are formed of a thermoplastic resin, such as polyethylene or polyvinyl chloride. In short, the material of the members 2 and 3 is expected only to have a certain degree of rigidity and be able to maintain its shape. Thus, each base member may be formed of a plate or sheet of a nonmagnetic material, such as some other synthetic resin or cardboard.

A scanning region 5 is located in a predetermined position in the object 1, and a code indicator section 6 is provided on the surface of the one card base member 2. Proper information which corresponds to the distribution of magnetic polymer elements 12 (mentioned later) in the scanning region 5 and other factors is enciphered and recorded in the code indicator section 6 by means of a processing apparatus 50, which will be mentioned later. The section 6 may be formed of a magnetic stripe which is narrower than the card base member 2, as in the illustrated case. However, the code indicator section 6 may be replaced with a record medium, such as a conventional bar code, two-dimensional bar code, or OCR characters, which can be read optically.

The magnetic-polymer-filled layer 4 includes a base material 11 which, formed mainly of paper, is filled with a large number of magnetic polymer elements 12 scattered at random. As shown in FIG. 4, the base material 11 contains a large number of wood pulp fibers 13. The fibers 13 and the elements 12 are mixed integrally in the base material 11. The magnetic-polymer-filled layer 4 may be as large (wide) as the card base members 2 and 3, or may be in the form of a strip which is located at least in the scanning region 5.

Figure 15:
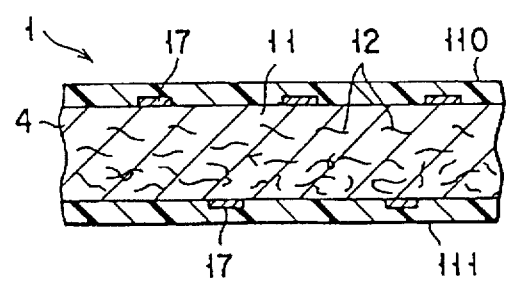
FIG. 15 is a sectional view showing a modification of the to-be-checked object.

As shown in FIG. 15, each magnetic polymer element 12 is in the form of a fiber in which particles of magnetic metal powder 16 are distributed in an element main body 15 of a high-molecular weight material so as to cover the entire cross section thereof. Acrylic resin is a suitable example of the high-molecular weight material used for the main body 15. Alternatively, however, a thermoplastic resin, such as polyethylene or polyester, or urethane resin may be used. In short, the material for this application may be any conventional synthetic resin which has proper flexibility and stretchability.

The magnetic polymer elements 12 can be manufactured by the use of a manufacturing device 20 shown in FIG. 6. The manufacturing device 20 comprises an acrylic solution supply section 22, having a nozzle 21 from which an acrylic solution is jetted, and a solution tub 24 which contains a coagulating solution 23.

Figure 7:
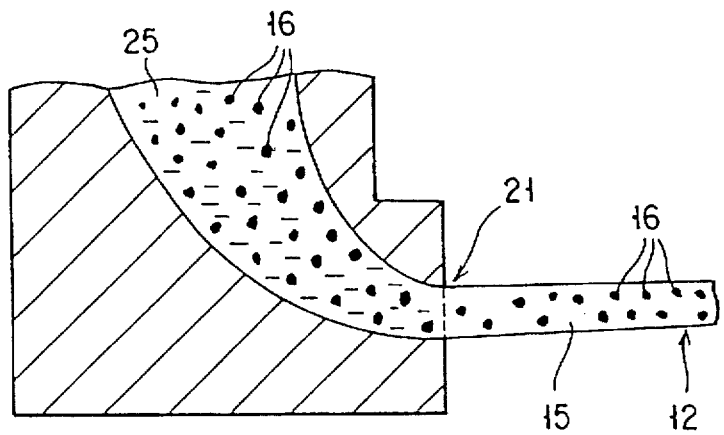
FIG. 7 is a sectional view showing part of the apparatus of FIG. 6 in an enlarged scale.

As shown in the enlarged view of FIG. 7, an acrylic solution 25, containing a large number of particles of the magnetic metal powder 16, is made to come out from the nozzle 21 and pass through the coagulating solution 23. As a result, the magnetic polymer element 12 is obtained in which a large number of magnetic metal powder particles 16 are contained in the element main body 15 of acrylic resin. The element 12 is cut into pieces with a length of about 2 to 10 mm, for example. The cross section of the magnetic polymer element 12 need not be circular in shape, and may have a rectangular, oval, or polygonal shape.

In the case where the main body 15 of each magnetic polymer element 12 is formed of acrylic resin, the specific gravity of the element 12 resembles that of the wood pulp fibers 13. In this case, the elements 12 and the fibers 13 easily mix with one another in a pulp solution. Microscopically, innumerable fine projections cover the surface of the acrylic resin (i.e., surface of each element 12), so that the magnetic polymer elements 12 and the wood pulp fibers 13 can be very firmly tangled with one another. Since conventional metallic magnetic wires are liable to collect under the pulp solution, they cannot be easily mixed with wood pulp fibers. Since these conventional wires have a smooth surface, moreover, they cannot easily catch the pulp fibers 13.

Figure 8:
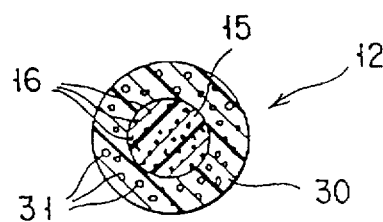
FIG. 8 is a sectional view showing a modification of the magnetic polymer element.
Figure 9:
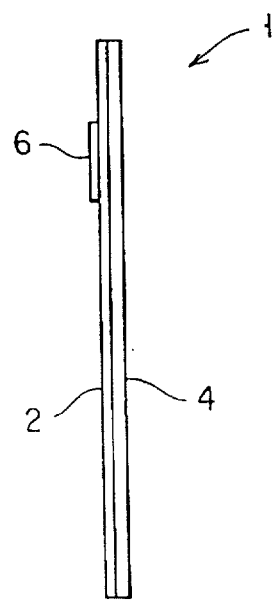
FIG. 9 is a side view of a to-be-checked object having a card base member on one side of a base material.

As shown in FIG. 8, the whole outer peripheral surface of each magnetic polymer element 12 may be covered by a coating layer 30 which resembles the base material 11 in color. If the base material 11 is white-colored, the coating layer 30 used is a white or whitish one which is formed of a high-molecular weight material containing titanium oxide 31. If the base material 11 is brownish, the coating layer 30 should preferably be also brownish.

Figure 19:
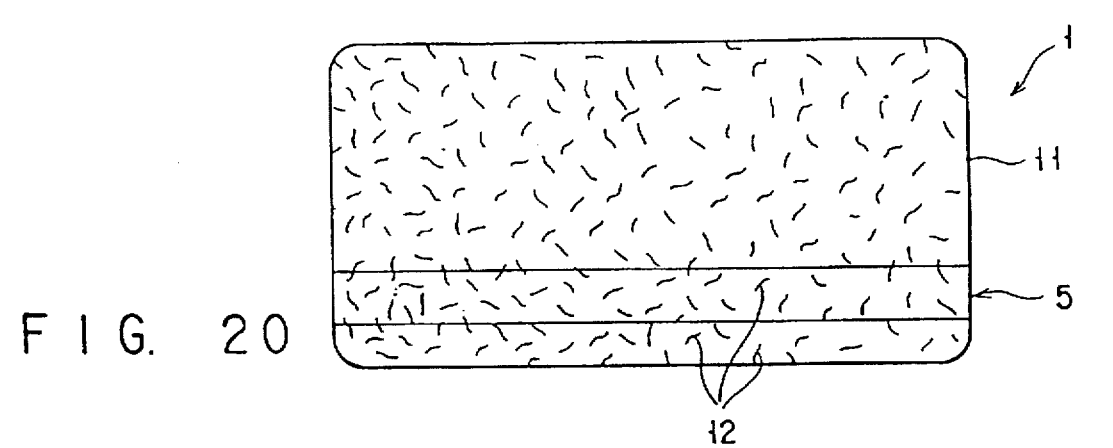
FIG. 19 is a sectional view showing part of an apparatus for manufacturing the magnetic polymer element shown in FIG. 8.

The magnetic polymer element 12, thus having the coating layer 30 thereon, can be manufactured by means of an acrylic solution supply section 36 which has a dual-structure nozzle 35, as shown in FIG. 19. In this case, the acrylic solution 25, which contains the magnetic metal powder 16, is made to come out into the coagulating solution 23 (see FIG. 6) in a manner such that it is surrounded by a polymer solution 37 which contains titanium oxide 31. In this manner, the magnetic polymer element 12 covered with the coating layer 30 is manufactured.

The magnetic polymer elements 12 and the wood pulp fibers 13 can be integrally mixed with one another without a problem by a conventional paper pulp manufacturing process. Thus, the magnetic-polymer-filled layer 4 in the form of paper of a predetermined size can be manufactured by undergoing some steps. These steps include a step of obtaining the pulp solution containing the wood pulp fibers 13 and the magnetic polymer elements 12 mixed together, a step of stirring the pulp solution to make a sheet with a predetermined thickness in which the fibers 13 and the elements 12 are tangled with one another in three dimensions, and a step of cutting the sheet into pieces of a predetermined size by means of a cutter. The card base members 2 and 3 are pasted on the magnetic-polymer-filled layer 4 by heat welding or by using suitable fixing means such as an adhesive.

Preferably, the mixing ratio of the magnetic metal powder 16 ranges from 30 to 80% by weight. If the mixing ratio is lower than 30% by weight, an output obtained from the powder 16 may not be high enough for practical use. If the mixing ratio exceeds 80% by weight, in contrast with this, the strength (tensile strength, in particular) of the magnetic polymer elements 12 lowers impracticably. The particle diameter of the magnetic metal powder 16 is 1 µm or less, for example. Preferably, the average particle size ranges from about 0.2 to 0.3 µm.

Preferably, moreover, the length of the magnetic polymer elements 12 ranges from 2 to 10 mm. If the elements 12 are shorter than 2 mm, they are so minute that they are uniformly distributed like powder. Accordingly, the output of the processing apparatus 50, which will be mentioned later, is so uniform that it is not likely to indicate a random distribution. If the elements 12 are longer than 2 mm, it is likely to indicate a random distribution. If the elements 12 are longer than 10 mm, they cannot easily mix with the wood pulp fibers 13 in the pulp solution, and it is hard to incorporate these elements 12 integrally in paper by the presently available paper making technology.

It is to be desired that the magnetic polymer elements 12 have a diameter ranging from 10 to 100 µm. If their diameter is 10 µm or more, the elements 12 can produce an output of a practicable level, provided that they contain a sufficient amount of magnetic metal powder 16. The larger the element diameter, the higher the output level will be. If the elements 12 have a diameter larger than 100 µm in the case where the thickness of the base material 11 (or of the magnetic-polymer-filled layer 4) is 100 µm or thereabout, however, they will be partially exposed on the surface of the base material 11. Thus, the magnetic polymer elements 12 should have a diameter smaller than the thickness of the base material 11.

Instead of using the base material 11 made of paper, the magnetic-polymer-filled layer 4 may be formed by twining the magnetic polymer elements 12 around an aggregate of numerous fibers of a nonmagnetic material, e.g., acrylic resin fibers, in three dimensions, and bonding them together by means of a binder resin or matrix resin. As in the case of a to-be-checked object 1 shown in FIG. 9, moreover, the card base member 2 may be provided on only one side of the magnetic-polymer-filled layer 4.

The processing apparatus 50 shown in FIG. 10 comprises a housing 55 and a conveyor mechanism 56. The conveyor mechanism 56 is composed of conveyor members 57 including a belt and rollers, and is used to move the to-be-checked object 1 at a predetermined speed in the direction indicated by arrow F in FIG. 10.

A magnetic sensor 60 is provided in the middle of the path of transfer of the object 1. The sensor 60 includes a pair of MR elements 61 and 62 for use as magneto-electric transducers, which are arranged in the moving direction of the object 1, and a magnet 63 as magnetic field generating means which is located behind the elements 61 and 62.

The MR elements 61 and 62 are magnetoresistor elements whose electrical resistance varies depending on the intensity of magnetic fields applied thereto. These elements 61 and 62 are connected electrically to each other, and are arranged so as to be subjected to magnetic fields of the same intensity which are generated by the magnet 63. The first MR element 61 is connected to a controller 80 (mentioned later) through a detection circuit 74, while the second MR element 62 is connected to a DC power supply circuit 75.

As the magnetic polymer elements 12 pass under the MR elements 61 and 62, an output voltage $V_{out}$ varies. More specifically, when the elements 12 are not situated in the vicinity of the MR elements 61 and 62, the magnetic fields generated by the magnet act equally on the elements 61 and 62, so that the respective resistances of the elements 61 and 62 are equal. Therefore, the output voltage $V_{out}$ is about one half ($V_{in}/2$) of an input voltage $V_{in}$. As the magnetic polymer elements 12, moving in the direction indicated by arrow F in FIG. 10, pass under the MR elements 61 and 62, magnetic fluxes passing through the MR elements 61 and 62 change with time, depending on the position of the polymer, elements 12, and the respective resistances of the MR elements 61 and 62 differ from each other. As a result, the output voltage $V_{out}$ varies above and below $V_{in}/2$.

If the resistances of the first and second MR elements 61 and 62 are $R_1$ and $R_2$, respectively, the output voltage $V_{out}$ is given by $$V_{out}=V_{in}\times\{R_2/(R_1+R_2)\}.$$

The level of the output voltage $V_{out}$ varies depending on the distributing conditions of the magnetic polymer elements 12, including the distribution density, depth of embodiment, diameter (or thickness), length, and orientation thereof. Accordingly, an output voltage pattern peculiar to the object 1 can be detected.

The processing apparatus 50 comprises a controller 80 incorporating a microcomputer or the like, a code write section 81 for recording a cipher code (mentioned later) in the code indicator section 6 of the object 1, a code read section 82 for reading the cipher code from the indicator section 6, and the like. The sections 81 and 82 are connected to a code read/write circuit 83. The controller 80 includes an analog-to-digital converter 90, a comparator 91, a cipher code converter 92, etc. A display 95 is connected to the controller 80.

The following is a description of the operation of the apparatus 50 according to the embodiment described above.

Figure 11:
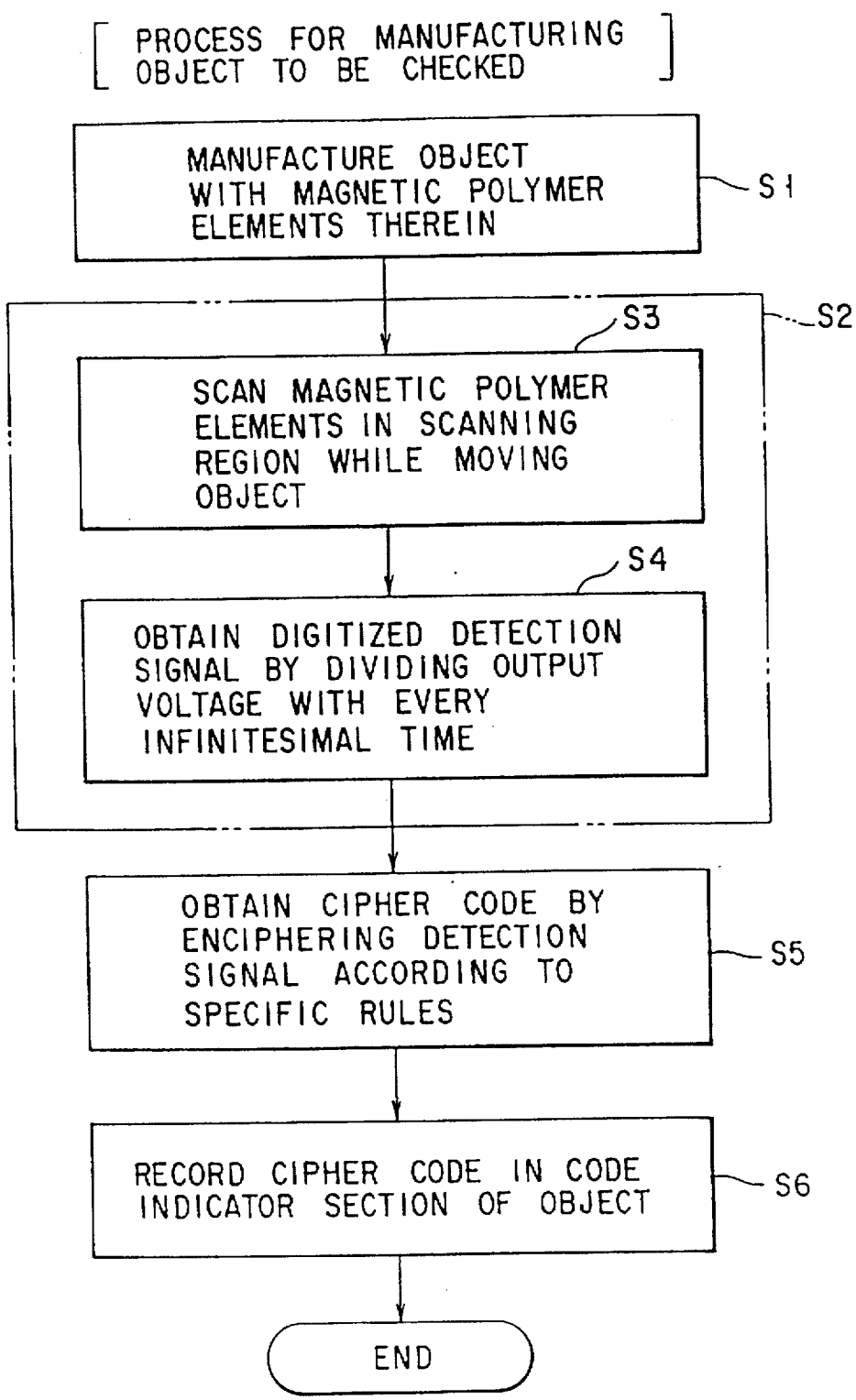
FIG. 11 is a flowchart showing steps of processing for manufacturing the to-be-checked object.

FIG. 11 shows an outline of the process for manufacturing the object 1 to be checked. In Step S1, the magnetic polymer elements 12 are incorporated into the magnetic-polymer-filled layer 4 as the object 1 is fabricated. Step S2 for scanning and detection includes Step S3 for scanning and Step S4 for detection.

In Step S3 for scanning, the object 1 is moved at a predetermined speed in the direction of arrow F of FIG. 10 by means of the conveyor mechanism 56. Thereupon, a plurality of minute portions of the scanning region 5 successively pass by the MR elements 61 and 62. At this time, the magnetic fluxes passing through the MR elements 61 and 62 change with time, depending on the density, diameter, orientation, length, and depth of embodiment of the magnetic polymer elements 12, the properties of the magnetic metal powder 16, etc., so that the respective resistances $R_1$ and $R_2$ of the MR elements 61 and 62 differ from each other. Thus, the output voltage $V_{out}$ is measured as an output voltage pattern peculiar to the object 1. In the present embodiment, the scanning region 5 is detected at infinitesimal time intervals, and output voltages corresponding to the individual infinitesimal time intervals are ranked in a plurality of stages, for digitization, in Step S4 for detection. In this manner, an encoded detection signal which is peculiar to the scanning region 5 is obtained.

In Step S5 for enciphering, this detection signal is enciphered according to specific rules by means of the cipher code converter 92. In Step S6 for recording, a cipher code thus obtained is recorded in the code indicator section 6 by means of a magnetic head of the code write section 81.

In this embodiment, the code indicator section 6 is formed of a magnetic stripe. Alternatively, however, the cipher code may be printed in the form of an optically readable mark or code (e.g., bar code, two-dimensional bar code, OCR characters, etc.) on the code indicator section 6. Alternatively, moreover, holograms with predetermined codes recorded therein may be sequentially stamped in accordance with the cipher code. Furthermore, the cipher code may be stored in a code storage area of a host computer.

Figure 12:
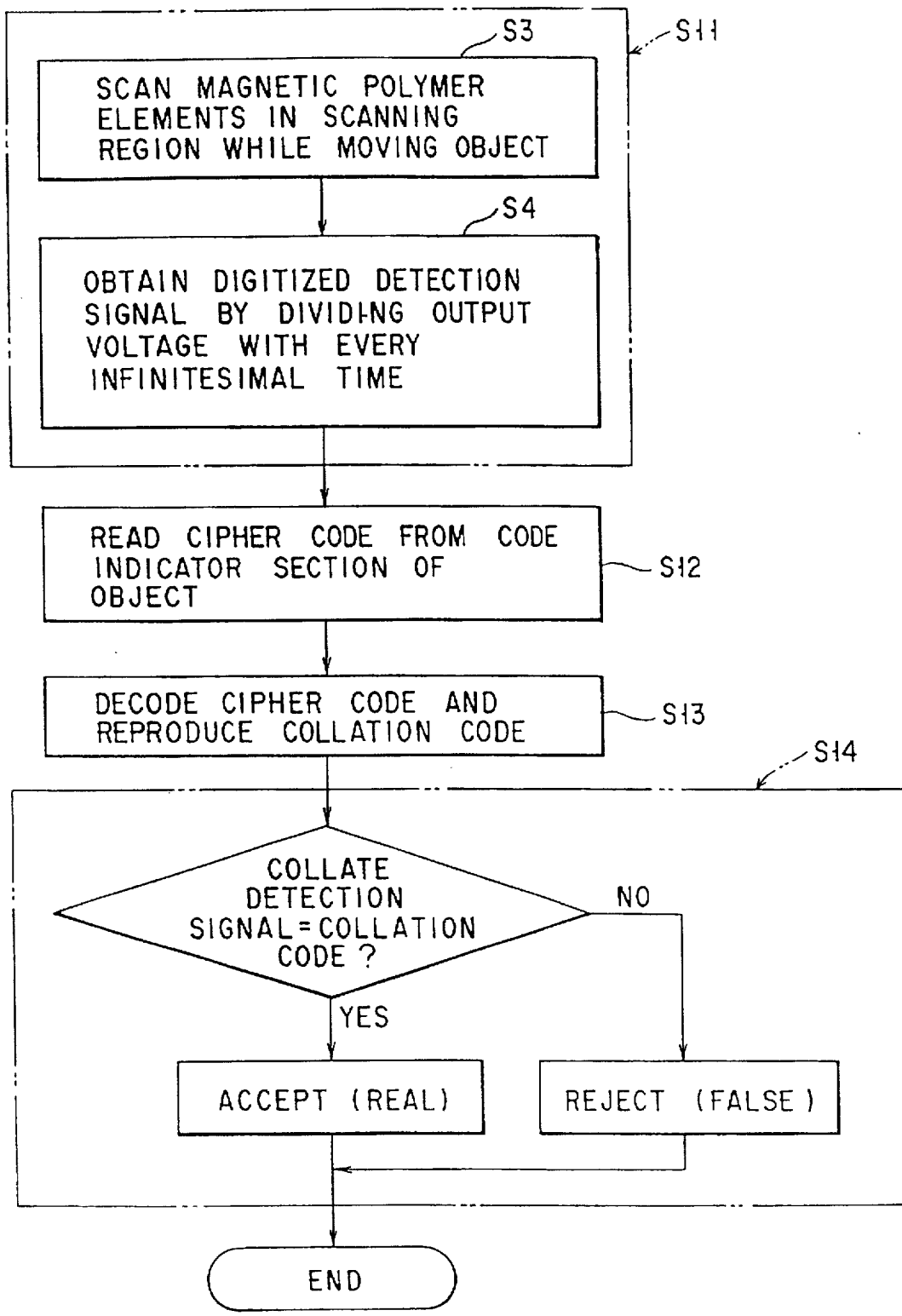
FIG. 12 is a flowchart showing steps of processing for collating the object.

The processing apparatus 50 described above is also used for checking to see if the object 1 is authentic. FIG. 12 shows an outline of a collation process for checking the object 1 for authenticity. Step S11 of this process includes Step S3 for scanning and Step S4 for detection which are similar to those of the object manufacturing process. In Step S11, a detection signal corresponding to the distribution of the magnetic polymer elements 12 is obtained by means of the sensor 60 by scanning the scanning region 5 at the predetermined speed.

In Step S12 for code reading, the cipher code recorded in the code indicator section 6 is read by means of the code read section 82. In Step S13 for code reproduction, the read cipher code is decoded according to predetermined rules by means of the cipher code converter 92, whereby a code for collation is reproduced. In Step S14 for determination, the collation code is compared with data for the detection signal detected in Step S4 for detection, by means of the comparator 91. Only when the code and the data agree with each other, it is concluded that the object 1 is authentic, and the result of the collation is indicated on the display 95.

In the case where the cipher code is registered in the code storage area of the host computer in the aforementioned object manufacturing process, the cipher code may be fetched from the host computer and collated with the detection signal in the collation process. Alternatively, in the collation process, the detection signal obtained in Step S4 for detection may be enciphered according to the same rules as those for the manufacturing process so that the resulting cipher code can be collated with the cipher code read in Step S12 for code reading.

In the case where the aforesaid code can be recorded in the host computer or the like, a personal identification number inputted by a user or other codes recorded in the object 1 must be collated with the code recorded in the host computer or the like. In this case, the apparatus can be applied to, for example, a guard system for entrance and exit management or other special security system, as well as to conventional bank cards and credit cards.

The magnetic polymer elements 12 used in the object 1 according to the above-described embodiment are extremely flexible, and the wood pulp fibers 13 of the base material 11 and the elements 12 are tangled with one another in three dimensions. Accordingly, the magnetic polymer elements 12 can be incorporated adequately in the magnetic-polymer-filled layer 4 which is as thin as paper. Moreover, the conspicuity of each magnetic polymer element 12 can be reduced by covering it with the coating layer 30 which resembles the base material 11 in color, so that the security can be further improved.

Figure 13:
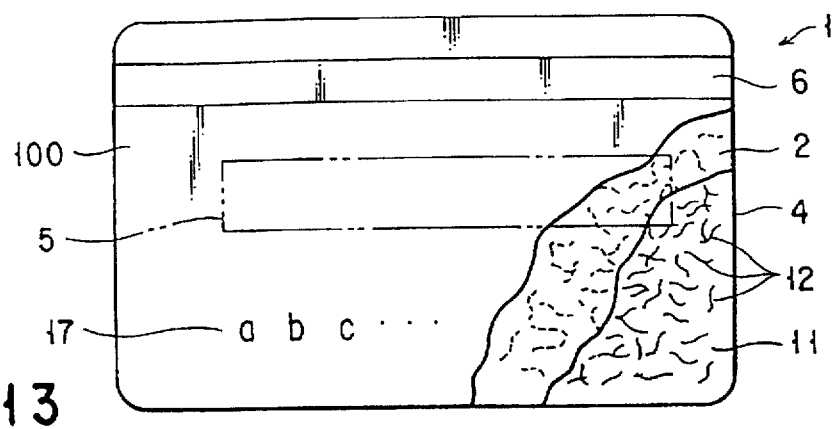
FIG. 13 is a cutaway plan view showing a modification of the to-be-checked object.
Figure 14:
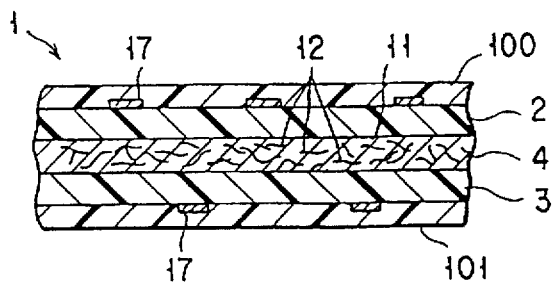
FIG. 14 is a partial sectional view of the object shown in FIG. 13.

A card-like object 1 (an example of a bank card) to be checked shown in FIGS. 13 and 14 is composed of first and second plastic card base members 2 and 3, which has a predetermined size, a magnetic-polymer-filled layer 4 sandwiched between the base members 2 and 3 for lamination, and protective layers (overlay films) 100 and 101 on the surfaces of the base members 2 and 3, respectively. The arrangements of the magnetic-polymer-filled layer 4, a scanning region 5, a code indicator section 6, etc., as well as the material of the base members 2 and 3, are the same as the ones described in connection with the foregoing embodiment. If necessary, indication data 17, such as characters and symbols, are printed on the respective surfaces of the base members 2 and 3. The protective layers 100 and 101 for protecting the printed characters, symbols, etc. are formed of a transparent synthetic resin, e.g., polyvinyl chloride or polyethylene terephthalate, through which the indication data 17 can be seen.

A method for manufacturing the object 1 comprises a step of fabricating the card base members 2 and 3 using, for example, a synthetic resin such as polyvinyl chloride or paper, a step of fabricating the magnetic polymer elements 12, a step of preparing the magnetic-polymer-filled layer 4 by incorporating the elements 12 into the base material 11, and a step of uniting the base members 2 and 3 and the polymer-filled layer 4 together by heat welding or by means of an adhesive. In the case where the base material 11 of the magnetic-polymer-filled layer 4 is a synthetic resin, the magnetic polymer elements 12 are incorporated at random into the resin before the resin is set.

The object 1 can be prevented from being warped by symmetrically arranging the card base members 2 and 3 on either side of the magnetic-polymer-filled layer 4 which is provided in the center of the object 1 with respect to the thickness direction thereof, as in the embodiment described above. In other words, the object 1 may possibly be warped during use unless the layer 4 is located in its center with respect to its thickness direction.

In the case where the magnetic-polymer-filled layer 4 is provided in the center of the object 1 with respect to the thickness direction thereof, and where an opaque material is used for the card base members 2 and 3, as in the above-described embodiment, the magnetic polymer elements 12 cannot be seen from the outside. Since the elements 12 are arranged in three dimensions, moreover, high security can be enjoyed.

As shown in FIG. 15, furthermore, card base members 110 and 111, which serve also as protective layers, may be stacked individually on the opposite surfaces of the magnetic-polymer-filled layer 4 by heat welding or by means of an adhesive. In the case where the indication data 17, such as characters and symbols, are printed on the magnetic-polymer-filled layer 4, it is advisable to use a transparent synthetic resin as a material for the base members 110 and 111 which double as protective layers. In this case, the magnetic polymer elements 12 may be subjected to a whitening process as required. In the whitening process, the surface of each magnetic polymer element 12 may be coated with a whitish material such as titanium oxide, as in the case of the foregoing embodiment (FIG. 8), or whitish powder or pigment, such as titanium oxide, may be incorporated into each element main body 15. By doing this, the magnetic polymer elements 12 can be made to be apparently inconspicuous.

Figure 16:
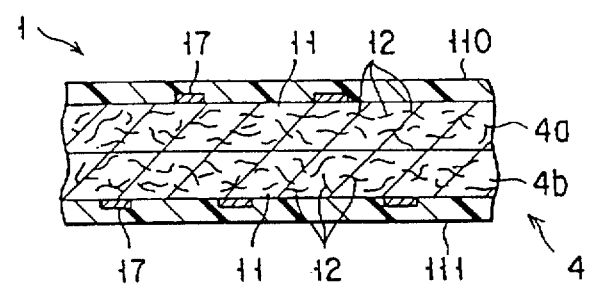
FIG. 16 is a sectional view showing another modification of the object.

As shown in FIG. 16, moreover, card base members 110 and 111, which serve also as protective layers, may be pasted on the outer surfaces of a plurality of magnetic-polymer-filled layers 4a and 4b (two in number in the illustrated case), respectively, by heat welding or by means of an adhesive. The layers 4a and 4b are united together also by heat welding or by means of an adhesive. If the two or more magnetic-polymer-filled layers 4a and 4b are stacked in the thickness direction in this manner, the magnetic polymer elements 12 are not unevenly distributed in the thickness directions of the layers 4a and 4b. Thus, the elements 12 are distributed substantially uniformly, so that the detection signal output can be stabilized successfully. Also in this case, the magnetic polymer elements 12 are subjected to the aforesaid whitening process as required.

Figure 17:
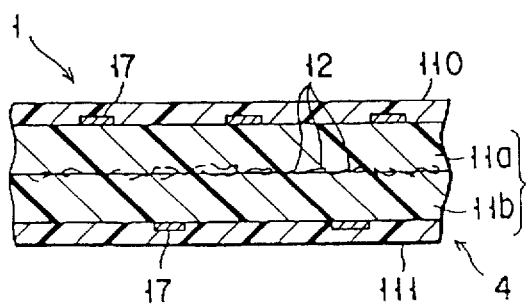
FIG. 17 is a sectional view showing still another modification of the object.

In a magnetic-polymer-filled layer 4 shown in FIG. 17, magnetic polymer elements 12 are distributed between two plate-like base materials 11a and 11b which are formed mainly of a synthetic resin, and the materials 11a and 11b are united together. A method for manufacturing this object 1 comprises a step of fabricating card base members 110 and 111 formed of a synthetic resin or paper, a step of fabricating the magnetic polymer elements 12, a step of fabricating the plate-like base materials 11a and 11b formed of a nonmagnetic material, such as a synthetic resin, and a step of uniting the base materials 11a and 11b and the card base members 110 and 111 together by heat welding or by means of an adhesive in a manner such that the elements 12 are distributed between the base materials 11a and 11b.

If the portion stuffed with the magnetic polymer elements 12 is located in the center of the object 1 with respect to the thickness direction thereof, as in the present embodiment, the object 1 undergoes no warp. Preferably, in this case, an opaque material should be used for the base materials 11a and 11b so that the magnetic polymer elements 12 are externally invisible.

Figure 18:
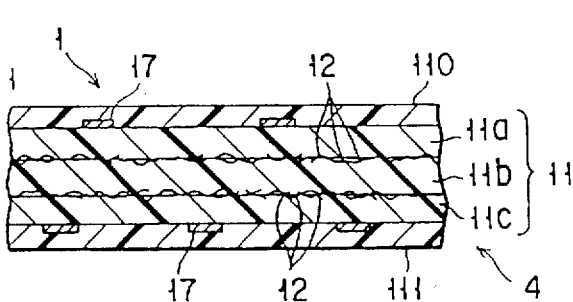
FIG. 18 is a sectional view showing a further modification of the object.

In a magnetic-polymer-filled layer 4 shown in FIG. 18, magnetic polymer elements 12 are distributed between three or more base materials 11a, 11b and 11c so that diverse laminate patterns can be obtained. In order to prevent the resulting object 1 from being warped, in this case, portions stuffed with the polymer elements 12 should preferably be stacked in layers so as to be symmetrical with respect to the center of the thickness of the object 1.

Figure 20:
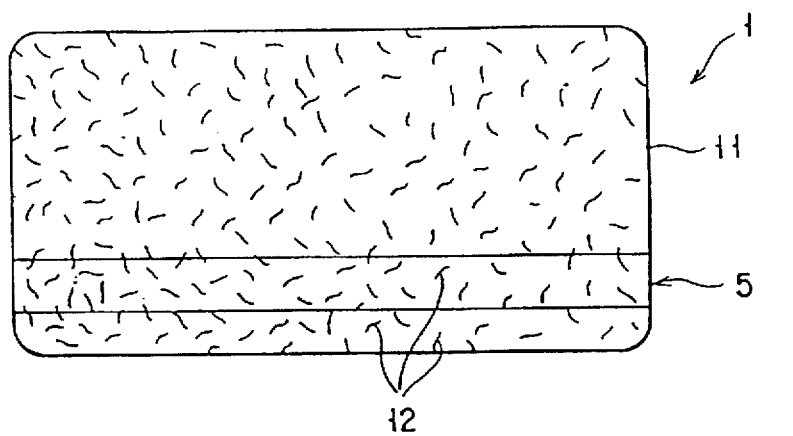
FIG. 20 is a plan view showing an additional modification of the to-be-checked object.

In an object 1 shown in FIG. 20, a large number of magnetic polymer elements 12 are distributed at random throughout a base material 11 which is formed mainly of paper, so as to be oriented in various unspecified directions. The base material 11 contains a large number of wood pulp fibers 13, as shown in FIG. 4. A scanning region 5 is located in a specific position in the base material 11.

Figure 21:
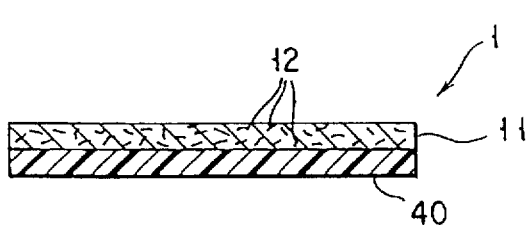
FIG. 21 is a sectional view showing an example of a to-be-checked object having a magnetic layer.

In an object 1 shown in FIG. 21, a magnetic layer 40 for recording various data is stacked on a base material 11 of paper which is stuffed with magnetic polymer elements 12. The magnetic layer 40 may be provided on each surface of the base material 11. The layer 40 has a thickness of, for example, 10 μm or thereabout.

Figure 22:
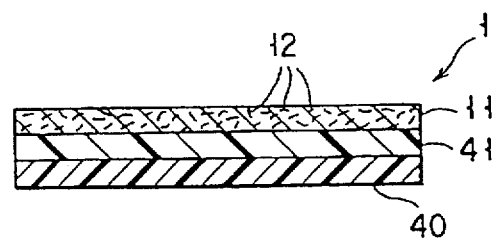
FIG. 22 is a sectional view showing an example of a to-be-checked object having a magnetic layer and a nonmagnetic intermediate layer.
Figure 23:
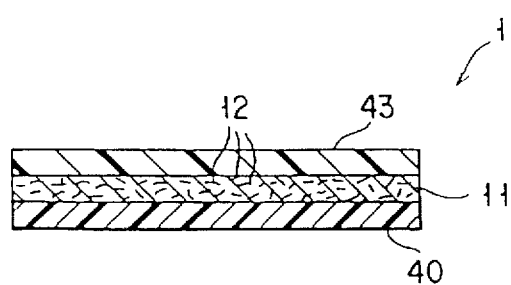
FIG. 23 is a sectional view showing an example of a to-be-checked object having a magnetic layer and a cover layer.
Figure 24:
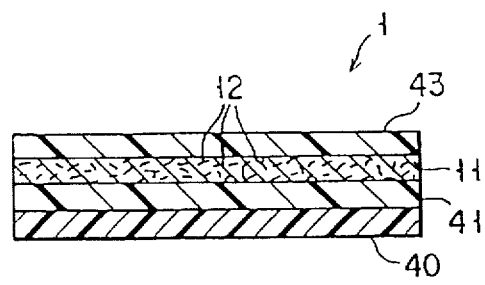
FIG. 24 is a sectional view showing an example of a to-be-checked object having a magnetic layer, a nonmagnetic intermediate layer, and a cover layer.

As in an object 1 shown in FIG. 22, moreover, a nonmagnetic intermediate layer 41 formed of a nonmagnetic material, such as a synthetic resin or paper, may be interposed between a base material 11 and a magnetic layer 40. In this case, magnetic polymer elements 12 and the magnetic layer 40 can be effectively prevented from exerting influences upon one another. As shown in FIG. 23 or 24, furthermore, the surface of a base material 11 may be covered by a cover layer 43 of a synthetic resin or paper.

Figure 25:
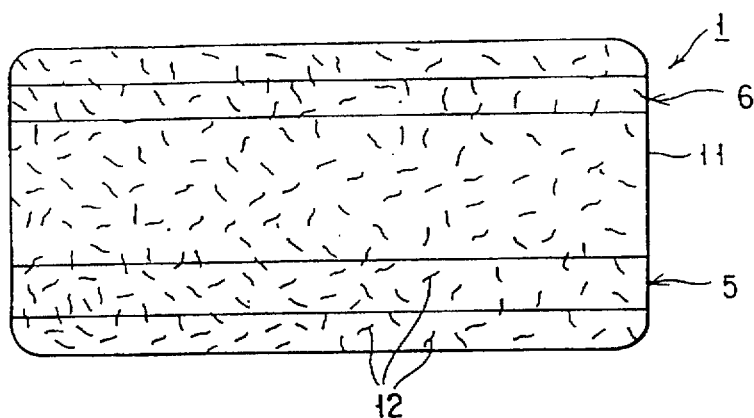
FIG. 25 is a plan view of a to-be-checked object having a magnetic code indicator section.

An object 1 shown in FIG. 25 is provided with a code indicator section 6 which is similar to the one used in the embodiment shown in FIG. 1. Proper information, which corresponds to the distribution of magnetic polymer elements 12 in a scanning region 5 and the like, is enciphered by means of the processing apparatus 50, and is written in the code indicator section 6. The section 6 may be formed of a magnetic stripe which is narrower than a base material 11, or may be replaced with the magnetic layer 40.

Figure 26:
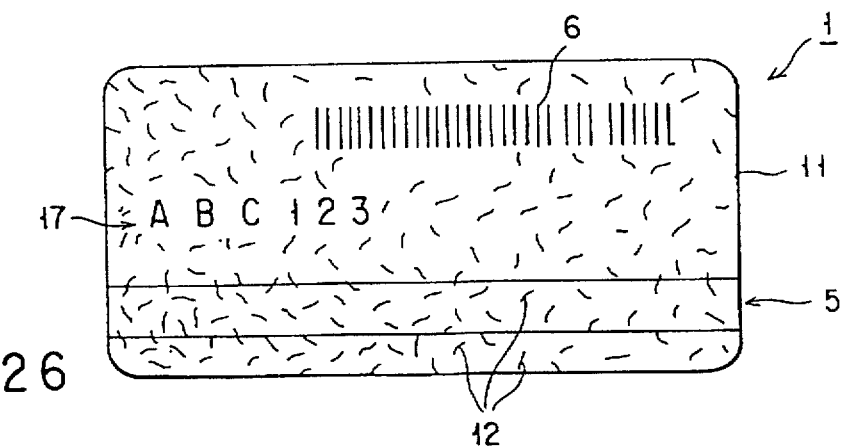
FIG. 26 is a plan view of a to-be-checked object having an optical code indicator section.

An object 1 shown in FIG. 26 is printed with predetermined indication data 17, such as figures, characters, symbols, etc., and is provided with a code indicator section 6 which uses a bar code as an example of optical code indicating means. The indication data 17 and a proper output signal, which corresponds to the distribution of magnetic polymer elements 12 in a scanning region 5 and the like, are enciphered by means of the processing apparatus 50, and is printed as a bar code on the code indicator section 6.

More specifically, in Step S5 for enciphering shown in FIG. 11, the detection signal and the indication data 17 are associated with one another and enciphered according to specific rules for enciphering by means of the cipher code converter 92. In Step S6 for recording, a cipher code thus obtained is printed on the code indicator section 6 by means of the bar code printing head of the code write section 81. A conventional bar code for recording may be replaced with a mark and a code which can be optically read by means of the code read section 82. The indication data 17 may be recorded in handwriting or by stamping instead of being printed. Moreover, the surface of the base material 11 may be coated with a resin film or the like.

Figure 27:
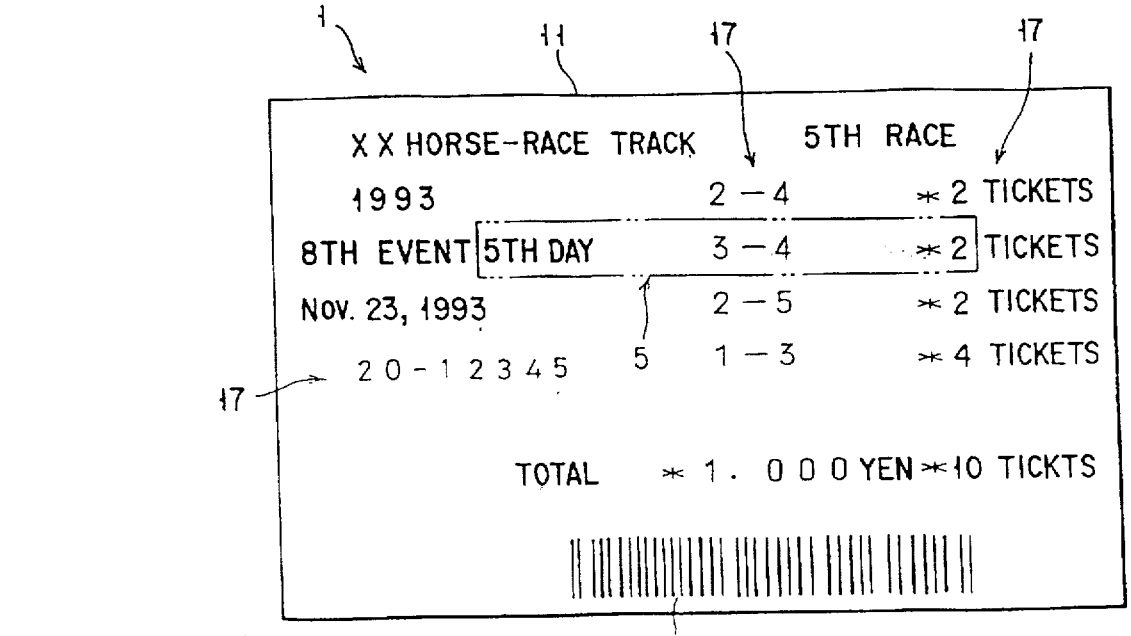
FIG. 27 is a plan view of a betting ticket for publicly-managed gambling as an example of a to-be-checked object.

FIG. 27 shows a betting ticket for publicly-managed gambling as a specific example of a to-be-checked object 1. This object (betting ticket) 1 is printed with indication data 17 in figures, including a serial number, post position numbers, bet numbers, etc. A code indicator section 6 is printed with a bar code which is obtained by enciphering the indication data and proper information corresponding to the distribution of magnetic polymer elements 12 in a scanning region 5, by means of the processing apparatus 50.

Figure 28:
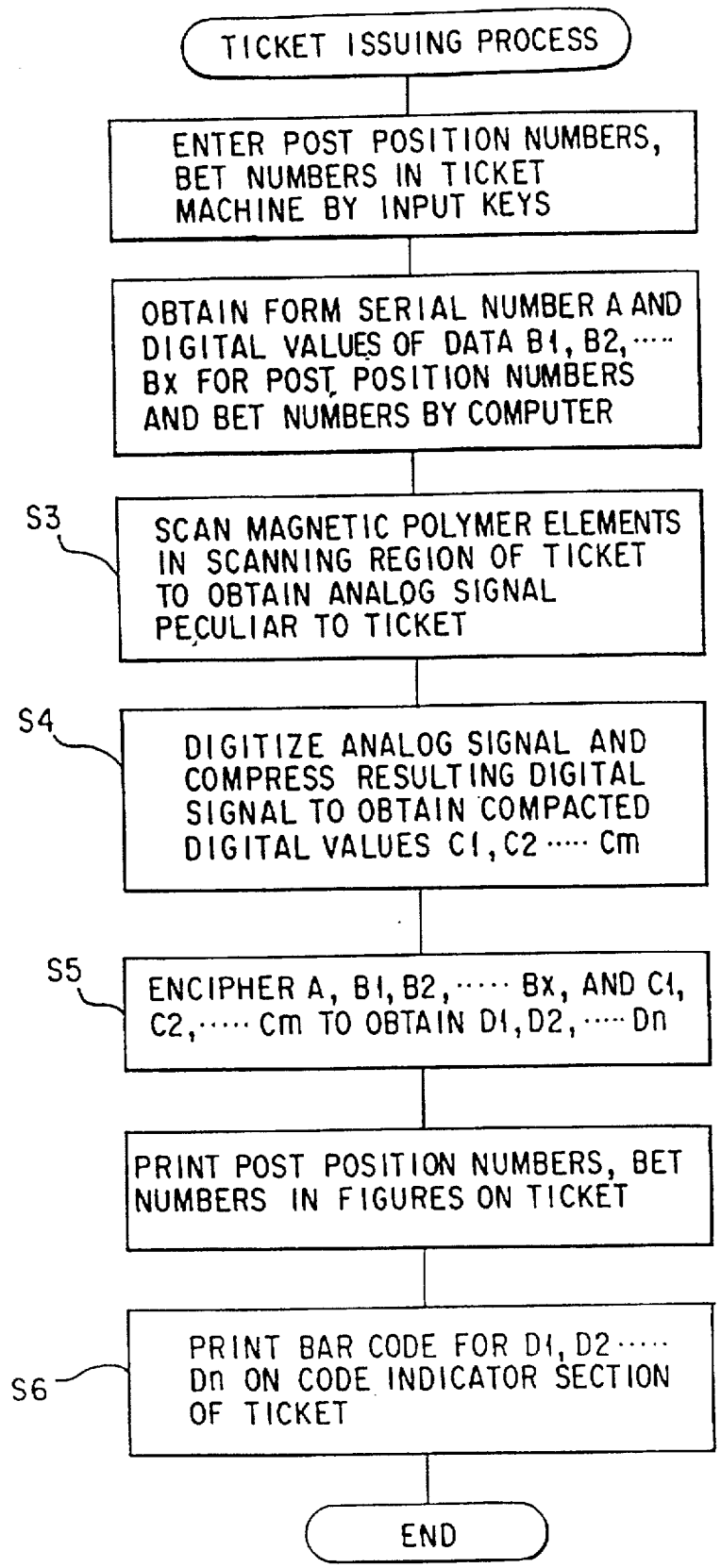
FIG. 28 is a flowchart showing an issuing process for the object shown in FIG. 27.
Figure 29:
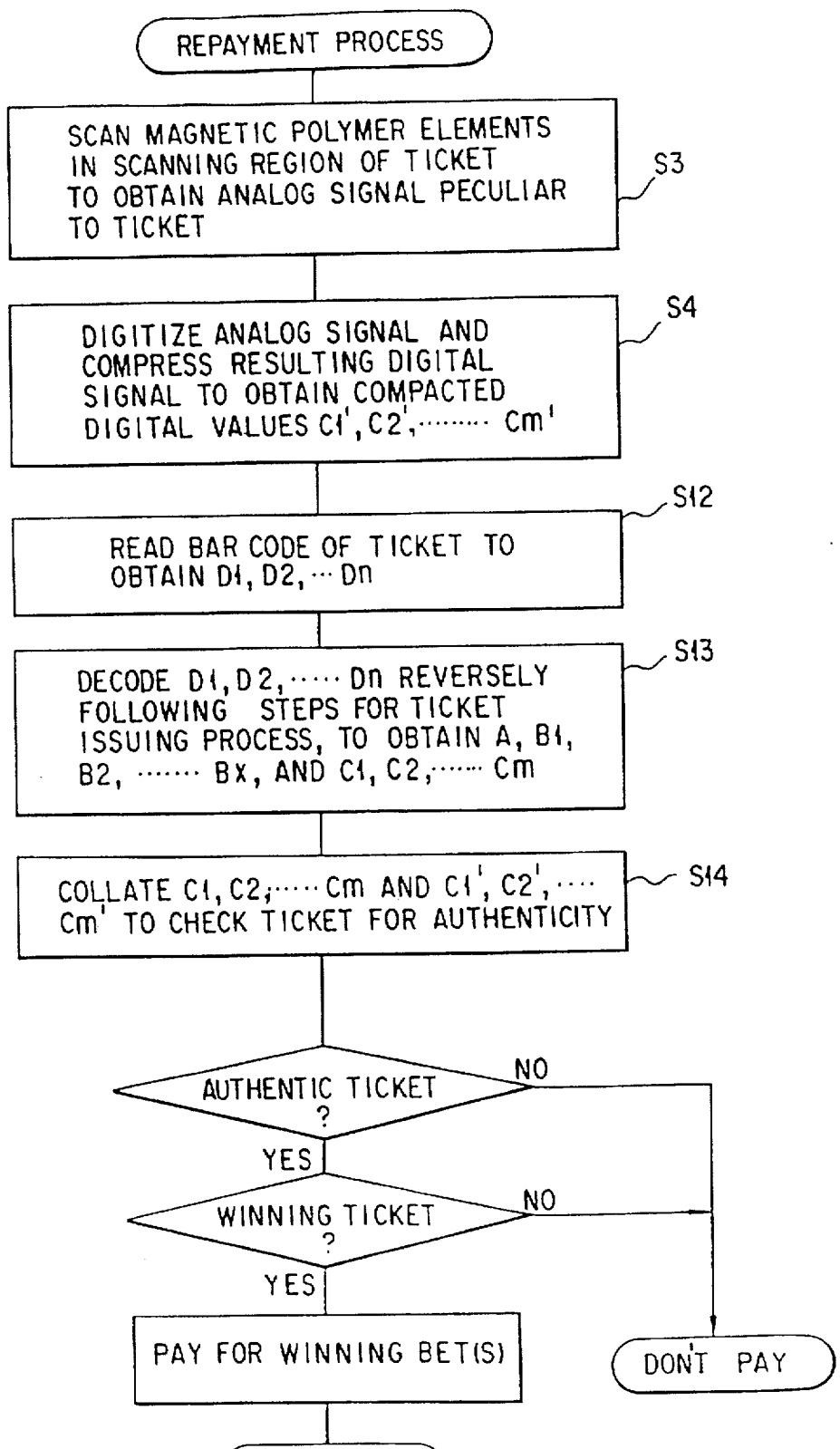
FIG. 29 is a flowchart showing a repayment process for the object shown in FIG. 27.

FIG. 28 shows an outline of an issuing process for the object 1, while FIG. 29 shows an outline of a repayment process. Like numerals refer to those steps which are common to the manufacturing process (FIG. 11) and the collating process (FIG. 12).

In the issuing process shown in FIG. 28, when the post position numbers and bet numbers for betting are entered in a ticket machine by means of input keys, a form serial number A and digital values of data B1, B2, ... Bx for post position numbers and bet numbers are prepared in a computer in the machine. Also, the aforementioned scanning process of Step S3 is executed so that the magnetic polymer elements 12 in the scanning region 5 of this ticket are scanned, whereupon an analog signal peculiar to the thicket is obtained. In Step S4 for detection, the analog signal is compressed to obtain compacted digital values C1, C2, ... Cm. In Step S5 for enciphering, moreover, the data A and the data B1, B2, ... Bx and C1, C2, ... Cm are enciphered to obtain data D1, D2, ... Dn.

Indication data including the post position numbers and bet numbers are printed on the surface of the ticket in the same manner as the conventional method. Moreover, a bar code indicative of the enciphered data D1, D2, ... Dn is printed on the code indicator section 6 by means of the code write section 81 of the processing apparatus 50.

In a repayment process shown in FIG. 29, the scanning process of Step S3 is executed so that the magnetic polymer elements 12 in the scanning region 5 of the ticket are scanned, whereupon the analog signal peculiar to the thicket is obtained. In Step S4 for detection, moreover, the analog signal is compressed to obtain compacted digital values C1', C2', ... Cm'. In Step S12 for code reading, the bar code on the code indicator section 6 is read by means of the code read section 82 of the processing apparatus 50, whereupon the data D1, D2, ... Dn are obtained. In Step S13 for code reproduction, the data D1, D2, ... Dn are decoded reversely following the steps of procedure for the ticket issuing process, whereupon the serial number A and the data B1, B2, ... Bx and C1, C2, ... Cm for the post position numbers and bet numbers are obtained. In Step S14 for determination, furthermore, the data C1, C2, ... Cm are collated with C1', C2', ... Cm'. If these data agree with one another, it is concluded that the ticket is authentic. A repayment for the winning numbers is made only when the ticket is an authentic winning ticket.

What is claimed is:

1. An object to be checked for authenticity, comprising:

a base material formed of paper containing a plurality of wood pulp fibers;

a plurality of fibrous magnetic polymer elements incorporated in the base material, together with the wood pulp fibers, each of the elements including an element main body formed of an acrylic resin and magnetic metal powder contained therein;

the wood pulp fibers and the magnetic polymer elements being tangled with one another in three dimensions;

a scanning region for checking the object for authenticity; and a code indicator section for storing encoded information corresponding to an output obtained in accordance with the distribution of the magnetic polymer elements in the scanning region, said region and said section being located in said base material.

2. The object according to claim 1, wherein said code indicator section includes a magnetically readable medium for recording data.

3. The object according to claim 1, wherein said code indicator section includes an optically readable medium for recording data.

4. The object according to claim 1, wherein said base material has card base members of paper or a synthetic resin stacked thereon.

5. The object according to claim 1, wherein said base material includes opposite surfaces which are covered by card base members of paper or a synthetic resin.

6. The object according to claim 4, wherein said card base members are covered by films of a synthetic resin which are transparent to visible light.

7. The object according to claim 1, wherein said base material is covered by card base members of a (transparent) synthetic resin which are transparent to visible light and which also serve as a protective layer.

8. The object according to claim 1, wherein said base material includes opposite surfaces and has a magnetic layer on at least one of the opposite surfaces thereof.

9. The object according to claim 8, wherein a nonmagnetic intermediate layer formed of a nonmagnetic material is interposed between said base material and said magnetic layer.

* * * * *